United States Patent [19]

Seese et al.

[11] Patent Number: 4,499,197

[45] Date of Patent: Feb. 12, 1985

[54] CO-GEL CATALYST MANUFACTURE

[75] Inventors: Mark A. Seese, Ellicott City, Md.; Robert L. Chiang, Anaheim, Calif.

[73] Assignee: W. R. Grace & Co., New York, N.Y.

[21] Appl. No.: 361,426

[22] Filed: Mar. 24, 1982

[51] Int. Cl.$^3$ .......................... B01J 21/12; B01J 29/08
[52] U.S. Cl. ........................................ 502/65; 502/67; 502/235
[58] Field of Search ................... 252/453, 455 Z, 462; 502/65, 235, 67

[56] References Cited

U.S. PATENT DOCUMENTS

| | | | |
|---|---|---|---|
| 3,401,125 | 9/1968 | Jaffe | 252/453 X |
| 3,433,748 | 3/1969 | Magee, Jr. et al. | 252/453 |
| 3,451,947 | 6/1969 | Michael | 252/453 |
| 4,226,743 | 10/1980 | Seese et al. | 252/453 |

Primary Examiner—Carl F. Dees
Attorney, Agent, or Firm—Arthur P. Savage

[57] ABSTRACT

Catalytically active silica-alumina and silica-alumina-rare earth oxide cogels are prepared by reacting aluminate and silicate solutions to obtain a silica-alumina pregel, and then reacting the pregel with an acidic rare earth and/or aluminum salt solution under complete mixing conditions.

15 Claims, 1 Drawing Figure

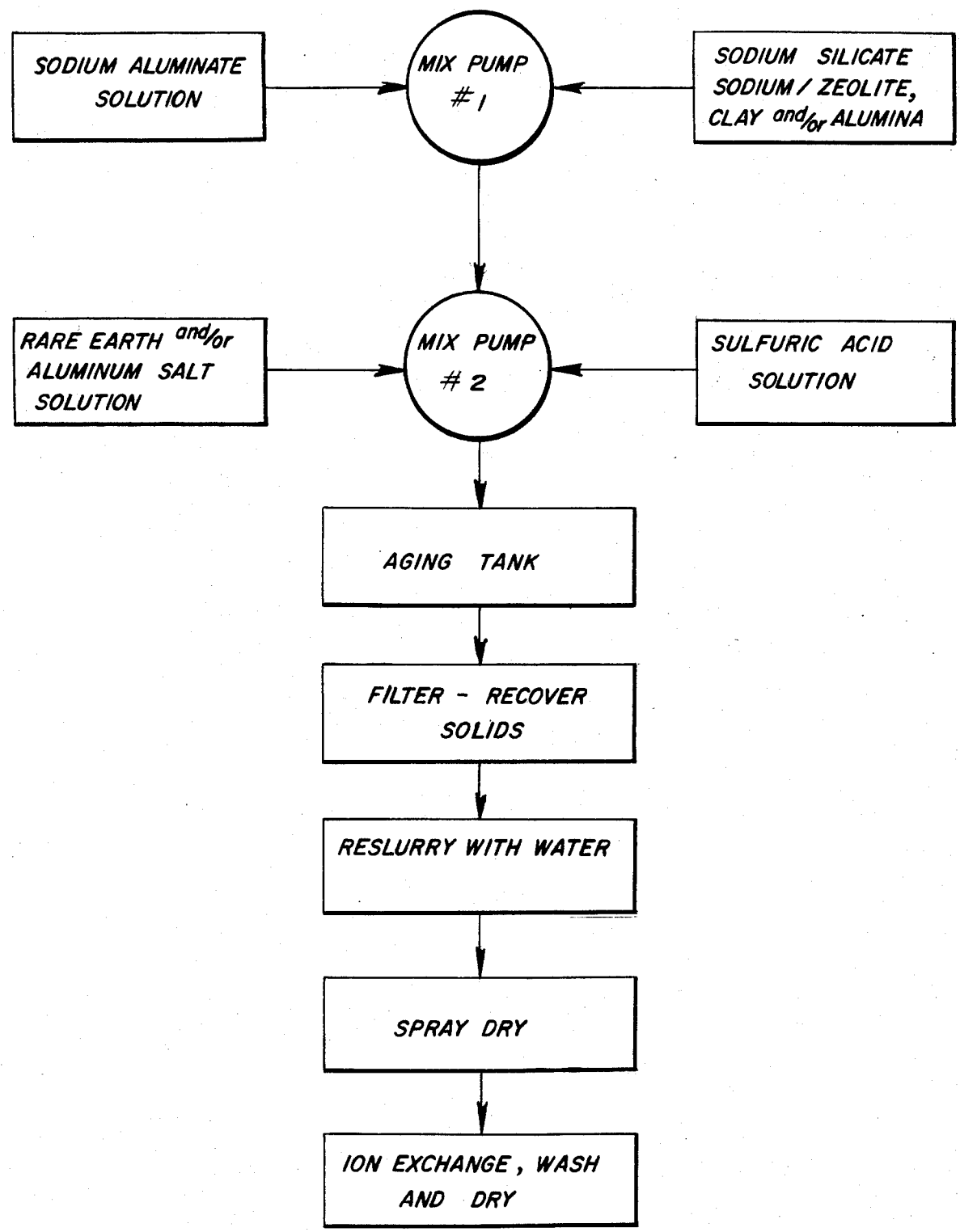

CO-GEL CATALYST MANUFACTURE

The present invention relates to the preparation of inorganic oxide hydrogels, and more particularly to catalytically active amorphous silica-alumina and silica-alumina-rare earth cogels which may be used as catalysts in the conversion of hydrocarbons.

Amorphous, catalytically active silica-alumina hydrogels are ordinarily prepared by reacting alkaline solutions of sodium silicate and/or aluminate with inorganic acids and/or acid metal salt solutions such as sulfuric acid and aluminum sulfate.

U.S. Pat. No. 3,459,680 describes the preparation of hydrocarbon conversion catalysts which comprise zeolite dispersed in an inorganic oxide matrix. The matrix may include silica-alumina-rare earth oxide components.

U.S. Pat. No. 3,974,099 describes the preparation of highly active amorphous silica-alumina catalysts. The catalysts may contain substantial quantities of alumina.

U.S. Pat. No. 4,111,846 describes the preparation of hydrosols and catalysts wherein an alkali metal silicate solution is reacted with a mixture of titanium and aluminum salts. A mix pump is used to rapidly and efficiently combine the silicate and mixed salt solutions.

U.S. Pat. No. 4,222,714 describes the preparation of silica hydrosols which are used as binders in the manufacture of particulate cracking catalysts. The silica sol contains salts of titania, zirconia, iron or ceria which modify the physical and/or catalytic characteristics of the catalyst.

U.S. Pat. Nos. 4,238,360, 4,246,138 and 4,264,474 describe the preparation of silica-alumina gels and catalysts which are exchanged with solutions of rare earth salts. The resulting catalysts are used in the conversion of hydrocarbons.

U.S. Pat. No. 4,247,420 describes the preparation of silica-alumina hydrogels which are characterized by a substantial surface area in pores of from about 25 to 75 Å in diameter. Hydrogels are used to catalytically convert hydrocarbons.

It is an object of the present invention to provide catalytically active inorganic oxide hydrogels.

It is a further object to provide a method by which dense, hard and catalytically active silica-alumina and silica-alumina-rare earth oxide cogels may be economically produced on a commercial scale.

It is still a further object to provide novel silica-alumina oxide cogel compositions which are particularly active for converting high molecular weight hydrocarbons into valuable hydrocarbon products such as gasoline and light cycle oil.

These and still further objects of the present invention will become readily apparent to one skilled in the art from the following detailed description and drawing wherein the FIGURE is a flow diagram of a catalyst manufacturing process of the present invention.

Broadly, our invention contemplates the preparation of silica-alumina and silica-alumina-rare earth oxide cogels wherein a silica-alumina pregel is formed by reacting alkali metal silicate and aluminate solution, and the pregel is subsequently reacted with an acidic aluminum and/or rare earth salt solution.

More specifically, we have found that catalytically active silica-alumina and silica-alumina-rare earth oxide cogels may be obtained by a process wherein:

(1) An alkali metal aluminate solution is reacted with an alkaline metal silicate solution to obtain a partially gelled silica-alumina reaction mixture (pregel) having a pH of from about 12.0 to 12.5. The time lapsed during this step is preferably about 0.5 to 5 seconds. Furthermore, the reaction is conducted under conditions of complete mixing but low shear.

(2) The pregel of step (1) is then reacted with an acidic solution of aluminum and/or rare earth salts and a mineral acid to obtain a silica-alumina/rare-earth oxide reaction mixture (cogel) having a pH of about 9 to 10. The time lapsed between the end of step (1) to the beginning of step (2) is preferably about 2 to 10 seconds and the reaction is conducted under conditions of complete mixing.

(3) The cogel of step (2) is then aged for a period of about 1 to 2 hours at a temperature of preferably from about 30° to 38° C. under quiescent conditions where very little mixing energy is expended during its aging period.

(4) The aged cogel of step (3) is then separated from the reaction mixture slurry by filtration and processed in a conventional manner, i.e. washed and ion exchanged to remove salts, formed into desired sized particles by spray drying, and dried to a desired moisture level.

In a particularly preferred practice of our invention, the cogels are mixed with zeolites, clay and/or alumina, and spray dried to obtain fluid catalytic cracking catalysts.

A typical process which incorporates the teachings of our invention is outlined in the drawing, wherein a sodium aluminate solution is reacted with a sodium silicate solution in centrifugal mix pump #1. The sodium silicate solution contains from about 2 to 8 parts by weight sodium $SiO_2$ silicate which has the composition 0.3 to 1 $Na_2O.SiO_2$. The sodium aluminate solution comprises 2 to 8 parts by weight sodium aluminate having the composition 1 to 1.4 $Na_2O.Al_2O_3$. Optionally, the sodium silicate solution may also contain a finely divided zeolite, clay and/or alumina component.

The aluminate/silicate components enter the centrifugal mix pump #1 through the center of the impeller thereof and are mixed under conditions of low shear and intimate mixing. The mixing in mix pump #1 is conducted under conditions of throughput so that the combined aluminate and silicate components result in a preparation of an aqueous slurry which has a pH of 12.0 to 12.5. Furthermore, the mixing conditions are such that the impeller frequency is on the order of 1000 to 2000 rev/min. The resulting silica-alumina pregel contains from about 2 to 8 parts by weight aluminate and from about 2 to 8 parts by weight silicate in quantities which result in the preparation of a pregel slurry which contains from about 4 to 16 percent by weight solids. In the event additional zeolite, clay or alumina components are included, the solids content of the slurry will increase to the range of from about 8 to 24 percent by weight.

As shown in the drawing, the pregel from mix pump #1, having a pH of 12 to 12.5, is then conducted to centrifugal mix pump #2 through the impeller thereof. Preferably, the time lapsing from the time the pregel reaction mixture leaves mix pump #1 to the time the mixture enters mix pump #2 is preferably from about 0.5 to 10 seconds, with linear flow velocities of about 50 to 150 cm/second. In mix pump #2 the pregel is combined with an acidic rare earth and/or aluminum salt solution and optionally a sulfuric acid solution. The rare earth and/or aluminum salt solution typically contains from about 1 to 80 percent by weight salts dissolved in water. Typically, the rare earth salts are mixed rare earth chlorides and sulfates, and the preferred aluminum salt solution is aluminum sulfate.

The conditions in mix pump #2 are the same as pump #1 except that the linear flow velocities leaving pump #2 are preferably about 5 to 20; cm/second. The reaction slurry which exits from mix pump #2, hereinafter referred to as the cogel slurry, has a pH of from about 9 to 10. This slurry then is held in an aging tank wherein the slurry is subjected to only slight mixing for a period of from about one to one and a half hours during which the desired pore structure develops in the cogel.

Subsequent to aging, the cogel is recovered by filtration, and then washed to remove soluble impurities such as sodium and sulfate salts. The washing takes place by reslurrying the solids recovered by filtration with water to a level of from about 10 to 15 weight percent solids. Subsequent to washing, the alkali metal and sulfate content of the cogel ranges from about 5 to 10 and preferably 0.1 to 1 percent by weight. Subsequent to washing the cogel solids may be reslurried with water and spray dried to obtain fluid size catalyst particles which range in size from about 10 to 100 microns. Optionally, the cogel solids may be recovered and formed into larger size catalyst particles by using conventional forming techniques such as extrusion granulation and pilling. Subsequent to forming, the catalyst particles may be ion exchanged/impregnated to impart desired levels of promoter metals and/or stabilizing ion such as rare earth. After washing/ion exchanging/impregnating to a desired level, the catalyst particles are dried to a desired moisture content of from about 8 to 16 percent by weight.

The amorphous silica alumina cogels of our invention possess a silica content ($SiO_2$) of from about 10 to 90 and preferably 15 to 35 parts by weight and an alumina content ($Al_2O_3$) of from about 10 to 90 and preferably 65 to 85 parts by weight. The silica-alumina-rare earth oxide cogels contain from about 10 to 90 and preferably 15 to 35 parts by weight $SiO_2$, from about 10 to 90 and preferably 60 to 80 parts by weight $Al_2O_3$, and from about 0.5 to 20 and preferably 1 to 10 parts by weight $RE_2O_3$.

The silica-alumina-rare earth cogels produced in accordance with the teachings of the present invention exhibit a pore size distribution which may be varied by changing the rare-earth content. Typically the cogels have a hydrothermally stable pore structure in which the majority of the pores are centered at about 70 Å. UV absorption analysis of the rare-earth containing cogels which have been extracted with a combination of HCl and $NH_4Cl$ indicates the presence of $SiO_2$-$Al_2O_3$-$RE_2O_3$ tergel co-ordination.

In a particularly preferred embodiment the cogels are characterized by a surface area of about 100 to 400 $m^2/g$, and by about 30 to 60 percent of the surface area in pores having a diameter of about 40 to 100 Å as determined after steam treatment at 135020 F. for 8 hours.

When used as a hydrocarbon conversion catalyst or catalyst component, the cogels exhibit exceptional tolerance towards deactivation by metal contaminates such as Ni and V. Accordingly, the catalysts are particularly suited for the cracking of high molecular weight residual hydrocarbon feedstocks. It is also observed that cracking catalysts which include the cogel are selective for the production of olefins and gasoline of increased octane rating.

As indicated in the above, the cogels are found to be particularly active for the catalytic cracking of hydrocarbons. The cogels may be combined with zeolites such as crystalline aluminosilicate zeolites, clay and/or aluminas. The composited catalysts are found to be very effective for the catalytic cracking of petroleum derived gas oils to produce high yields of gasoline. Typical zeolites which may be combined with our cogels include Type X and Type Y zeolites, as well as the ZSM and naturally occurring zeolites. The zeolite component may be previously calcined and/or metal exchanged to obtain stable, catalytically active zeolites such as rare earth and/or hydrogen exchanged zeolites as shown in U.S. Pat. Nos. 3,293,192, 3,402,996, 3,607,043, and 3,676,368. The zeolite component typically comprises from about 5 to as much as 50 percent by weight of the overall catalyst composition. When the catalysts are prepared using clay or finely divided aluminas from about 5 to 60 percent by weight of the catalyst may comprise clay and/or alumina. The catalyst may also contain small quantities (1–100 ppm) of noble metals such as platinum and palladium which are used to oxidize CO and/or sulfur oxides during regeneration of the catalysts. Furthermore, the catalyst may include alumina-lanthanum additives which are particularly effective for reducing the emission of sulfur oxides during the catalyst regeneration process.

Having described basic aspects of our invention, the following examples are given to illustrate specific embodiments thereof:

EXAMPLE 1

A sodium aluminate solution (1.4 $Na_2O/Al_2O_3$ ratio) with a gravity of 1.048 g/ml was pumped at 4103 ml/min. together with a sodium silicate solution (4 weight percent $SiO_2$, 3.22 $SiO_2/Na_2O$ ratio) with a gravity of 1.038 g/ml at 1630 ml/min. into the impeller port of a dual inlet port centrifugal pump mixer. The effluent from this centrifugal pump mixer had a pH of 12.4 and was delivered immediately to a second centrifugal pump mixer via a tygon transfer tube. The reactants from the first mix pump arrived at the second mix pump in a pregelled state with a period of about 1 second from the time the reactants entered the first pump. A solution of $RECl_3 \cdot 6H_2O$, which contained 61.6 percent $RECl_3 \cdot 6H_2O$ crystals and had a gravity of 1.58 g/ml, was pumped to the second centrifugal pump mixer at a rate of 3.84 ml/min. which is equivalent to adding 1 percent $RE_2O_3$ based on the $Al_2O_3$ content of the formulation. A solution of 20 percent $H_2SO_4$ was also delivered to the second centrifugal pump mixer for the purpose of maintaining the pH of the reaction mixture at 9.5. Gelation of the mixture occurred at 9.5 pH and the resultant slurry was pumped to an aging tank. The cogel was aged at ambient conditions for 1 hour with minimal agitation. The aged slurry was filtered on a horizontal belt vacuum filter, reslurried to about 12 percent solids, spray dried to form microspheres, ion exchanged with solutions of 3 percent ammonium sulfate, and washed with deionized water. The filter cake was redried in a forced air convection oven for 16 hours at 350° F.

The physical, chemical and catalytic cracking (microactivity) properties of this cogel are set forth in Table 1.

TABLE 1

| Chemical Properties: | |
|---|---|
| $Al_2O_3$ (Wt. %) | 64.0 |
| $Na_2O$ (Wt. %) | 0.48 |
| $SO_4$ (Wt. %) | 0.94 |
| $RE_2O_3$ (Wt. %) | 0.36 |
| Physical Properties: | |
| Surface Area (m²/g) | 227 |
| Pore Volume (cc/g) | |
| Nitrogen | 0.31 |
| Water | 0.38 |
| DI/JI* | 8/1.0 |
| Average Pore Diameter, A° | 61 |
| Microactivity,** Vol. % Conversion | 60 |

*Davison/Jersy Attrition Index as defined in U.S. Pat. No. 4,247,420.
**After steaming at 1350° F. for 8 hours with 100% steam.

EXAMPLE 2

A cogel catalyst which comprised 10% by weight Z-14US Type Y zeolite (as described in U.S. Pat. No. 3,293,192) and 90% by weight silica-alumina-rare earth cogel was prepared as follows:

A sodium aluminate solution (4 wt. % $Al_2O_3$, 1.4 $Na_2/Al_2O_3$ ratio and a gravity of 1.048) was pumped at a rate of 2872 ml/min together with a sodium silicate solution (4 wt. % $SiO_2$, 3.22 $SiO_2/Na_2O$ ratio and gravity of 1.038) at 1128 ml/min into a dual inlet port centrifugal pump mixer. The sodium silicate solution contained 24.36 g Z-14US zeolite per each 1128 ml of solution. The pregelled output of the first mix pump was immediately delivered to a second mix pump. The time required for transfer between the first and second pump was about 1 second. A 5 percent by weight of $RE_2O_3$ solution of $RECl_3.6H_2O$ was simultaneously pumped to the second mix pump at a rate of 61.6 ml/min. A solution of 20 percent $H_2SO_4$ was also pumped to the second mix pump and adjusted so that the effluent from the second mix pump was controlled at a pH=9.5. The reactants were collected in a tank for 30 minutes followed by aging at ambient conditions and no agitation for 1 hour. The batch pH at this point was 9.3. The aged slurry was dewatered on a horizontal belt filter, reslurried in water to about 14 percent solids, recirculated with a pump in order to delump the slurry and then spray dried at inlet/outlet temperatures of 625°/300° F. The microspheroidal product was then ion exchanged with a dilute solution of ammonium sulfate and rinsed with water. The filter cake was redried in a forced air convection oven for 16 hours.

The physical, chemical and catalytic cracking properties of the catalyst prepared in this Example along with comparison with a sample of a commercial catalyst which is selective for the production of high octane gasoline fractions and which contains about 40 percent by weight Z14US zeolite, 25 percent by weight $SiO_2$ sol and 35 percent by weight clay are set forth in Table 2.

TABLE 2

| Catalyst: | Example 2 | Commercial |
|---|---|---|
| Chemical Properties: | | |
| $Al_2O_3$ wt. % | 70.0 | 67 |
| $Na_2O$ wt. % | 0.18 | 0.29 |
| $SO_4$ wt. % | 0.78 | 0.50 |
| $RE_2O_3$ wt. % | 1.06 | 0.10 |
| Physical Properties: | | |
| DI/JI | 20/1.2 | 14/1.3 |
| Catalytic Performance: | | |
| Microactivity, vol. %* | 64/70 | 67/70 |
| Pilot Unit Data:** | | |
| Conversion Vol. % | 68.5 | 67.0 |
| Gasoline Yield, Vol. % Conversion Vol. % | 0.80 | 0.80 |
| Octane Number, Research | 89.7 | 90.3 |
| Octane Number, Motor | 78.7 | 80.0 |
| Light Cycle Oil, Vol. % | 24.2 | 22.6 |
| Coke, Wt. % | 4.2 | 4.2 |

*After steaming 1350° F. for 8 hours with 100% steam at 15 psig.
**After steaming at 1520° F. for 12 hours with 20% steam at 0 psig.

We claim:
1. A method for preparing hydrogels which comprises:
   (a) reacting sodium aluminate and sodium silicate solutions under conditions of intense mixing to obtain a partially gelled reaction mixture having a pH of from about 12 to 12.5;
   (b) reacting the partially gelled reaction mixture with an acidic salt solution selected from the group consisting of aluminum and rare earth salts and mixtures thereof to obtain a cogelled reaction mixture having a pH of from about 9 to 10, said reaction being conducted under conditions of complete mixing;
   (c) aging the gelled reaction mixture to develop a desired pore structure; and
   (d) recovering the aged cogel.
2. The process of claim 1 wherein the time lapsed during step (a) is from 0.1 to 5 seconds.
3. The process of claim 2 wherein the time lapsed from the end of step (a) to the beginning of step (b) is about 0.1 to 5 seconds.
4. The method of claim 1 wherein said reaction steps (a) and (b) are conducted under low shear mixing conditions.
5. The method of claim 1 wherein said aging step (c) is conducted under conditions wherein a low level of mixing is maintained.
6. The method of claim 1 wherein said aging step (c) is conducted for a period of about 0.5 to 1.5 hours.
7. The method of claim 1 wherein said pore structure is characterized by the presence of a significant number of pores having a diameter of about 40 to 100 Å as determined after steam treatment at 1350° F. for 8 hours.
8. A silica-alumina-rare earth oxide tergel which consists essentially of from about 10 to 90 parts by weight $SiO_2$, 10 to 90 parts by weight $Al_2O_3$, and 0.5 to 20 parts by weight $RE_2O_3$, said tergel being characterized by a surface area of about 100 to 400 m²/g, and by about 30 to 60 percent of the surface area in pores having a diameter of about 40 to 100 Å as determined after steam treatment at 1350° F. for 8 hours.
9. The tergel of claim 8 further characterized as being a product prepared by the method of claim 1.
10. A hydrogel prepared by the method of claim 7.
11. A hydrocarbon conversion catalyst which comprises the tergel of claim 8.
12. A hydrocarbon conversion catalyst which comprises the hydrogel of claim 10.
13. The catalyst of claim 11 or 12 which contains a crystalline zeolite.
14. The catalyst of claim 13 which contains up to about 50 percent by weight clay.
15. The catalyst of claim 13 wherein the zeolite is a synthetic faujasite type Y zeolite.

* * * * *